United States Patent

[11] 3,607,013

[72] Inventor Jerome Saldick
         Princeton, N.J.
[21] Appl. No. 798,130
[22] Filed Feb. 10, 1969
[45] Patented Sept. 21, 1971
[73] Assignee FMC Corporation
         New York, N.Y.

[54] PRODUCTION OF NICKEL FLUORIDE
     5 Claims, No Drawings
[52] U.S. Cl. .................................................. 23/88,
                                                          136/28
[51] Int. Cl. ..................................... C01b 9/08,
                                                      C01g 53/08
[50] Field of Search ............................................ 23/88

[56] References Cited
     OTHER REFERENCES

"Encyclopedia of Chemical Reactions," Vol. 5, 1953 Ed., page 8, by C. A. Jacobson. Chapman & Hall, Ltd., London and New York

*Primary Examiner*—Edward Stern
*Attorneys*—Milton Zucker and Eugene G. Seems

ABSTRACT: A highly active, anhydrous nickel fluoride which is resistant to pickup of atmospheric water and is superior as a battery element in high energy lithium-nickel fluoride batteries, is produced by passing anhydrous gaseous hydrogen fluoride over amorphous basic nickel carbonate at a temperature of between 150°–300° C. and preferably 225°–250° C.

PRODUCTION OF NICKEL FLUORIDE

BACKGROUND OF THE INVENTION

1. Field of the Invention

The invention relates to the production of nickel fluoride and more specifically to production of an anhydrous nickel fluoride which is superior as a battery element in high energy lithium-nickel fluoride batteries.

2. Description of the Prior Art

The recent growth of interest in automobiles powered by electric batteries has intensified research in high energy rechargeable batteries. Among the most promising of these high energy rechargeable batteries is a lithium-nickel fluoride system. This battery provides a light weight, quickly rechargeable, high energy cell which shows real promise as a power source for use in applications ranging from aerospace to lawn mowers, outboard motors, power tools and the like.

In this system, anhydrous nickel fluoride forms the cathode, lithium metal is the anode and the electrolyte is a salt such as potassium hexafluorophosphate dissolved in an organic solution such as propylene carbonate. Anhydrous nickel fluoride has been prepared by the action of liquid hydrogen fluoride and nickel carbonate. when it is prepared from these reactants at low temperatures (e.g. $-25°$ to $12°$ C.), the nickel fluoride is very hygroscopic and therefore cannot be used as a battery element without prior washing with liquid hydrogen fluoride. When gaseous hydrogen fluoride is made to react with nickel oxide at high temperatures (e.g., on the order of $1,000°$ C.), serious operational problems, including excessive corrosion of equipment and hazard, are encountered. Neither of these methods are satisfactory and accordingly the anhydrous nickel fluorides which are presently available are very expensive.

Another difficulty has been encountered with nickel fluorides, which have been employed heretofore in lithium-nickel fluoride batteries. With such prior nickel fluorides, it has been necessary to run the cell of the battery produced therefrom through repeated discharge-charge cycles in order to render it fully operational. Use of such a discharge-charge cycle procedure has several disadvantages. Firstly, it requires a capital investment in costly electrical controls and equipment, as well as, skilled workmen for its operation. Secondly, the procedure is time consuming and hence a production bottleneck. Thirdly, the procedure is not reliable. In some cases even repeated discharge-charge cycles have not improved the efficiency of the cell.

It therefore has remained desirable to provide an economically satisfactory method for the preparation of anhydrous nickel fluoride, which would be superior to nickel fluorides normally produced as a battery element in lithium-nickel fluoride batteries, and which will function in batteries without application of a discharge-charge pretreatment.

SUMMARY OF THE INVENTION

I have now found that by reacting amorphous basic nickel carbonate with anhydrous gaseous hydrogen fluoride at a temperature between $150°-300°$ C. and preferably between $225°-250°$ C., a highly active, anhydrous, nickel fluoride which surprisingly is quite resistant to pickup of atmospheric water, is produced. This nickel fluoride has a surface area greater than 40 m$^2$/g. and a crystallite size of about 25 to 60 A. as determined by X-ray diffraction. This product may be used without further treatment as a very effective battery element in high energy lithium-nickel fluoride cells and is produced by my method at relatively low cost.

DESCRIPTION OF THE INVENTION AND PREFERRED EMBODIMENTS

In carrying out the present process, finely divided and amorphous nickel carbonate preferably is placed in a copper tube and heated by an electrical resistance heating means to a temperature of between $150°-300°$ C., and preferably of $225°-250°$ C. A anhydrous gaseous mixture of hydrogen fluoride and nitrogen in a 2 to 1 volume ratio at room temperature and pressure is then passed over or through this bed of nickel carbonate. For best efficiency at least an excess of hydrogen fluoride should be used. The reaction goes to completion in accordance with the following equation:

$$NiCO_3 + \rightarrow NiF_2 + CO_2 + H_2O$$

The carbon dioxide and water byproducts are swept away by the gas flow. The rate of flow of the gases should be sufficient to remove the carbon dioxide and water vapor as they are formed. The temperature of the reaction is critical and must be carried out between $150°-300°$ C. and preferably between $225°-250°$ C. The temperature must be high enough so that the carbon dioxide and water are efficiently removed but not so high as to promote crystal growth of the nickel fluoride.

The basic nickel carbonate useful in this invention is amorphous and has an Ni/CO$_3$ ratio of greater than 1 (usually about 1.3 with hydroxyl being the other anion). The use of copper apparatus is believed to avoid iron impurities which must be minimized when nickel fluoride is used for battery applications. The following example is given to illustrate the invention but it is not intended to limit the scope thereof in any way.

EXAMPLE I

Forty grams of basic nickelous carbonate (Analytical Reagent Grade) in finely powdered form was placed in a 2-foot-long copper tube (1 inch O.D. 1/16inch wall) maintained at $250°$ C. (as indicated by an iron-constant in thermocouple brazed to the wall of the reactor tube 8 inches from the bottom). The reactor tube was heated with an insulated nichrome wire heating element and covered with asbestos to maintain temperature uniformity along its length. A flow of 100 cc. per minute (measured at room temperature and pressure) of anhydrous, prepurified nitrogen and 200 cc. per minute of anhydrous hydrogen fluoride gas (evaporated from a cylinder of c.p. hydrogen fluoride) was passed upwards through the reaction tube for two hours. The hot gases leaving the top of the reactor were cooled in a downward-sloping air-cooled ¼inches O.D. copper tube, 3 feet long. Liquid water and gaseous carbon dioxide emerged from this tube. After about 2 hours, evolution of fumes indicated that hydrogen fluoride was also coming out of the reactor. The reaction was continued for another 30 minutes. The flow of hydrogen fluoride feed was stopped and the reactor was cooled to room temperature in flowing nitrogen. A substantially quantitative conversion of nickel carbonate to anhydrous nickel fluoride was obtained. The yellow product was nonhygroscopic in ordinary laboratory air, did not turn green when wet with liquid water, and was substantially insoluble in water, dilute sulfuric acid, and aqueous ammonia. Quantitative analysis showed 58.6 percent nickel, and 40.3 percent fluorine. It underwent a 0.44 percent weight loss when heated for 60 minutes at $115°$ C. Theory is 60.7 percent nickel and 39.4 percent fluorine. The X-ray diffraction pattern was in agreement with the known pattern for tetragonal nickel fluoride, assuming a unit cell with a $=4.70$A. and c$=3.08$A. The crystallite size of the product was 35A. and the surface area was 110 m.$^2$/g. Particle size was measured according to the procedure of Klug, H. and L. Alexander, X-ray Diffraction Procedures, John Wiley and Sons, New York, 1954 pp. 491–538. Surface area was determined according to the Continuous Flow Method of Nelsen, F.M. and F.T. Eggertsen, Analytical Chemistry, volume 30, p. 1,387 (1958) using the Perkin-Elmer Model 212-D Sorptometer.

This product was used in the manufacture of a nickel fluoride electrode which when used in a high energy lithium-nickel fluoride cell gave immediate high capacity results without the necessity of a preliminary discharge-charge cycle.

EXAMPLE 2

Example 1 was repeated except the reactor tube was heated to $175°$ C. The product had crystallite size of 32A. and a surface area of 101 m.²/g. This product also gave high capacity results when used as a battery element in a lithium-nickel fluoride battery.

EXAMPLE 3

The procedure of example 1 was repeated except that the reactor tube was heated to 300° C. The resulting product had a crystallite size greater than 100A. and a surface area of 47 m²/g. The product gave high capacity results when used as a battery element in a lithium-nickel fluoride battery; however, this product, while highly useful, was not quite as efficient as the products of examples 1 and 2.

COMPARATIVE EXAMPLE

Example 1 was repeated except the reactor tube temperature was maintained at 390° C. The product had a crystallite size greater than 300A. and a surface area of around 10 m²/g. When used as an element in a lithium-nickel fluoride battery without repeated preliminary discharge-charge cycles, the product gave poor results.

Pursuant to the requirements of the Patent Statutes, the principle of this invention has been explained and exemplified in a manner so that it can be readily practiced by those skilled in the art, such exemplification including what is to be considered to represent the best embodiment of the invention. However it should be clearly understood that, within the scope of the appended claims, the invention may be practiced by those skilled in the art, and having the benefit of this disclosure otherwise than as specifically described and exemplified herein.

What is claimed is:

1. A process for the preparation of highly active anhydrous nickel fluoride, having the formula $NiF_2$ which is highly resistant to pickup of atmospheric water, said nickel fluoride being superior as a battery element in high energy lithium-nickel fluoride batteries which process comprises reacting amorphous basic nickel carbonate with anhydrous gaseous hydrogen fluoride at a temperature between 150°–300° C., and removing carbon dioxide and water by-products of the reaction by the flow of the gases in the system, thereby producing the nickel fluoride with a surface area greater than 40 m²/g and a crystallite size of between 25 and 60A. as determined by X-ray diffraction.

2. The process of claim 1 in which the reaction is carried out by continuously flowing anhydrous gaseous hydrogen fluoride over amorphous nickel carbonate in finely powdered form.

3. The process of claim 1 in which the reaction is carried out in an iron-free reactor so as to prevent iron impurities from contaminating the nickel fluoride produced during the reaction.

4. The process of claim 1 in which the reaction is carried out at a temperature of about 225°–250° C.

5. The process of claim 3 wherein the iron-free reactor is a copper reactor.

UNITED STATES PATENT OFFICE
CERTIFICATE OF CORRECTION

Patent No. 3,607,013          Dated September 21, 1971

Inventor(s) Jerome Saldick

It is certified that error appears in the above-identified patent and that said Letters Patent are hereby corrected as shown below:

Column 1, line 24 "when" should read --When--.

Column 2, line 5 the formula reading $NiCo_3 +- NiF_2 + CO_2 + H_2O$ should read $NiCO_3 + 2HF \rightarrow NiF_2 + CO_2\uparrow + H_2O\uparrow$.

Signed and sealed this 27th day of June 1972.

(SEAL)
Attest:

EDWARD M. FLETCHER, JR.
Attesting Officer

ROBERT GOTTSCHALK
Commissioner of Patents